UNITED STATES PATENT OFFICE.

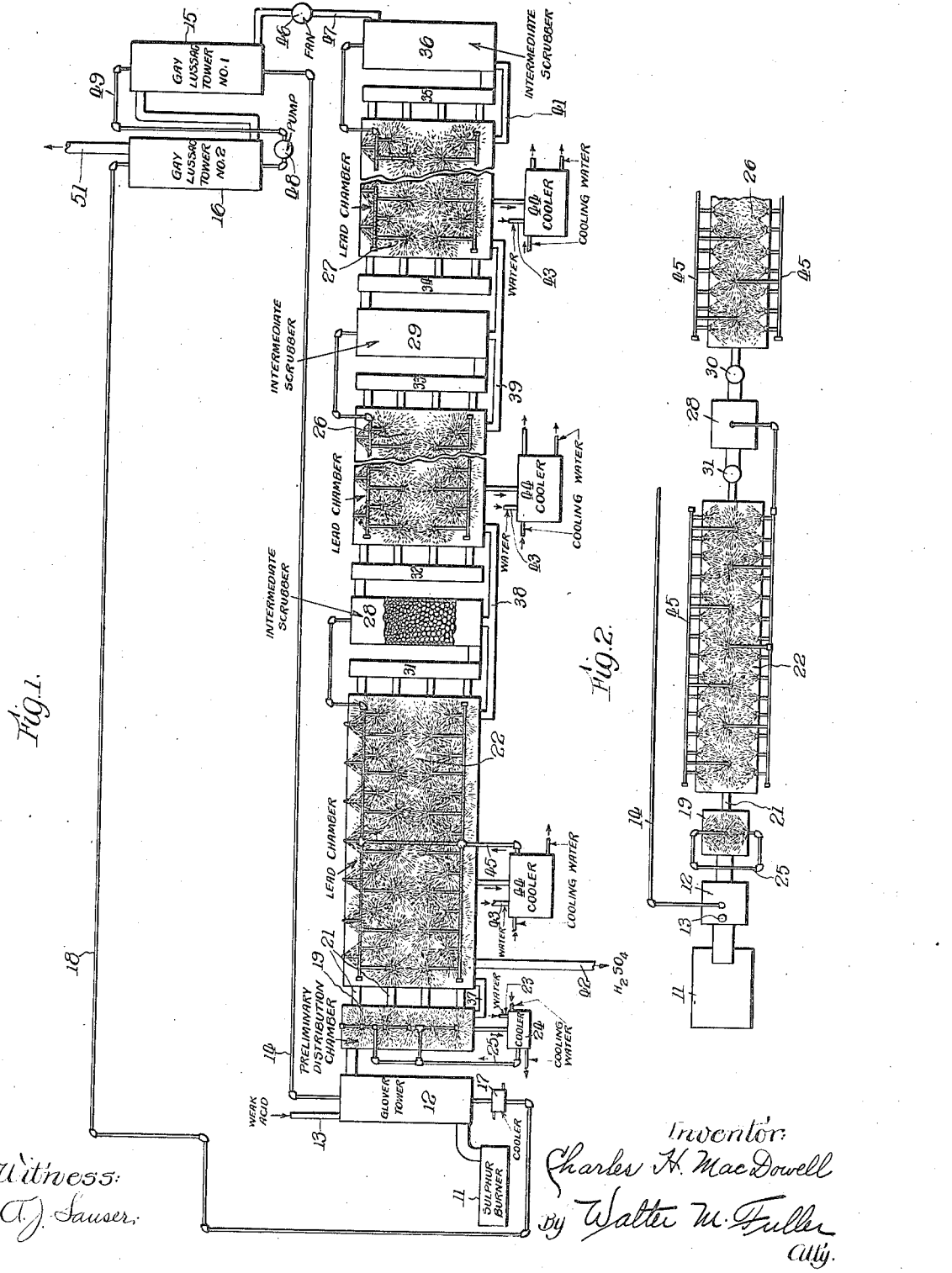

CHARLES H. MACDOWELL, OF CHICAGO, ILLINOIS, ASSIGNOR TO ARMOUR FERTILIZER WORKS, OF CHICAGO, ILLINOIS, A CORPORATION OF NEW JERSEY.

PRODUCTION OF SULPHURIC ACID.

1,402,941.

Specification of Letters Patent.  Patented Jan. 10, 1922.

Application filed January 20, 1921. Serial No. 438,556.

*To all whom it may concern:*

Be it known that I, CHARLES H. MAC-DOWELL, a citizen of the United States, residing at Chicago, in the county of Cook and State of Illinois, have invented certain new and useful Improvements in the Production of Sulphuric Acid, of which the following is a specification.

Heretofore, in the production of sulphuric acid on a large or commercial scale by the well-known chamber process, the hot gases, containing sulphur dioxide yielded by the burning of sulphur or pyrites, have been passed through a Glover-tower in the usual way over the loose packing or filling of which trickles down a mixture of nitrous vitriol from the Gay-Lussac tower and weak acid from the chambers in such proportions that they arrive at the bottom of the tower as denitrated sulphuric acid.

The gases now pass on to the large-volume lead-chambers where they meet with steam or with water converted into a fine spray.

Here the customary reaction takes place whereby the chamber acid is formed, the gaseous mixture flowing on through the Gay-Lussac tower, such mixture containing the whole of the free nitrogen of the air which had entered into the pyrites or sulphur burners, together with a portion only of the oxygen originally present therein, such excess of oxygen being required in order to carry out the conversion of the sulphur dioxide into sulphuric acid as completely as possible, traces of sulphur dioxide and some oxides of nitrogen.

In such Gay-Lussac tower the sulphuric acid flows down in sufficient quantity to retain the nitrous vapors, the waste gases ultimately being drawn off by a chimney or sometimes by mechanical means.

Many attempts have been made to reduce the chamber space by apparatus intended to bring about a better mixture of the gases, and to facilitate the interaction of the misty nitrous gases and dilute acid floating in the chamber with each other and with the chamber atmosphere. To this end reaction-towers have been placed between the chambers, but, though this and similar apparatus have proved to be useful in the later stages of the process, it has not been found practicable to do away with the lead-chambers entirely.

Since the reactions occur among gases and liquids in a nebulous state, vast spaces must be provided in which the process may be carried out as quickly as possible before the waste gases are allowed to escape into the outer air. Such spaces have heretofore been supplied in the form of large lead-chambers which are relatively expensive pieces of apparatus.

To complete the reaction and to secure the best results, the temperature of the gases should be reduced in the successive chambers by the transmission of heat through their lead walls as the percentage of sulphur dioxide decreases, although the reaction takes place in the first part of the system rather quickly because of the large excess of sulphur dioxide and oxygen, the temperature, and provided, of course, that sufficient water and nitre for the reaction is present.

The time factor is important and to complete the chemical change quickly requires the rapid extraction or dissipation of the original heat of the gases and the heat of the reaction. Accordingly, heretofore, such lead-chambers have been made of a sufficiently large size to conduct away the heat through their metal walls.

One leading aim of the present invention is the provision of means to cool the gases in such chambers comparatively rapidly and efficiently whereby to remove the heat and to facilitate the chemical reaction, by which means the capacity of existing chamber plants may be materially increased, thereby decreasing the cost of production.

Or, stated somewhat otherwise, the new invention makes possible the erection of a new plant at a substantially less cost as compared with that of the present day plants of the same capacity.

In the making of sulphuric acid the overhead expense is an important item because of the relatively heavy and expensive installation.

Hence it is highly desirable to be able to cut down such apparatus cost, thereby decreasing the expense of producing the acid.

Accordingly one leading purpose or aim of the invention is the rapid extraction of the heat from the gases of the lead-chambers and desirably also the provision of sufficient water at the same time for effecting the chemical transformations.

Obviously, water cannot be passed through the lead-chambers as a cooling medium because of the evolution of considerable heat produced by its contact with the sulphuric acid, and, furthermore, the employment of a substantial excess of water for temperature-reducing purposes, even if it could otherwise be so used, would detrimentally dilute the acid produced.

I have discovered, however, that sulphuric acid of reduced temperature may be satisfactorily used for its cooling effects in such lead-chambers, and, consequently, I draw off a portion of the warm acid from one or more of the chambers, add enough water to bring it down to about 50° Baumé, cool it, thus abstracting its original heat and that generated by the admixture with the water, and then introduce such reduced cooled acid in the form of sprays into all of the chambers, and in some cases also into the intermediate scrubbers or towers frequently employed between the chambers, at least in the preferred manner of practicing the process, eliminating the use of the ordinary separate water sprays, because the needed water for the reaction is present in the diluted acid.

Thus the water of such reduced acid is employed in the production of more sulphuric acid, while the acid of such diluted acid acts simply or chiefly as a cooling agent, keeping the temperature down and hence rendering possible a hastening or quickening of production and an increased capacity for the plant.

Ordinarily, the towers or scrubbers between the lead-chambers, by reason of their filling or packing, act merely to mix or commingle the gases thoroughly before they pass on into the next chamber thus facilitating the reaction therein.

In the present process and apparatus, however, the cold diluted acid introduced into the towers or scrubbers is used to precipitate the acid mist that forms, and such portions of the apparatus may be considered merely in the nature of scrubbers. The cooling in such parts of the appliance is incidentally beneficial but is not the main purpose for their use.

To enable those skilled in this art to fully understand the invention and to practice the same conveniently, efficiently, and economically, I have illustrated in the accompanying drawing a suitable apparatus, supplemented by a complete detailed description below, which may be readily employed in carrying out the improved and novel process, and in both views of the drawing the same reference numerals have been employed for like parts.

In this drawing:

Figure 1 is a more or less diagrammatic side elevation of the apparatus; and

Figure 2 is a fragmentary plan view of the same.

Referring to the illustrations in such drawings, it will be observed that as is usual the hot gases from the regular sulphur or pyrites burner or roaster 11 of approved type pass into the customary Glover-tower 12 fed at the top with weak acid at 13 and with nitrous vitriol through a connection 14 with one (15) of the associated Gay-Lussac towers 15 and 16, acid drawn from the bottom of the Glover-tower being reduced in temperature in a cooler 17 and fed to the top of the other or companion Gay-Lussac tower 16 through a suitable connection 18.

Nitre for replenishing is supplied by potting or any other approved method.

From the top portion of the Glover-tower, the gases flow into the upper part of a preliminary distribution-chamber 19 from which they pass through a plurality of conduits or flues 21 located at different elevations to the first, elongated, rather-narrow lead-chamber 22 of substantial size and capacity.

The hot gases in the initial or manifold chamber 19 are subjected through the side and top walls to sprays of cooled diluted sulphuric-acid obtained from the bottom of the same chamber where the withdrawn acid is diluted by water introduced at 23, the thus reduced or weakened acid being lowered in temperature by a cooler 24 supplied with cooling or heat-extracting water in any approved manner, the cooled diluted acid being fed through pipe connections 25 to the several spray nozzles of the same chamber, as is illustrated.

The water of such weakened acid, when sprayed into the chamber, is consumed in the usual way in the further production of sulphuric acid, whereas the cooled acid of such diluted liquid acts merely or principally as a constantly-traveling cooling medium traversing the chamber and the gases therein for conveying away a substantial proportion of the heat developed by the reaction, whereby the radiating or heat-conducting capacity of the lead walls of the chamber are not relied upon solely for this purpose, their heat dissipating function being supplemented by the cooling action of the introduced acid of the sprays.

The heat thus taken up by the circulating acid is abstracted by the cooling water of the cooler 24, which in addition absorbs the heat occasioned by the introduction of the diluent water added to the withdrawn acid after its leaving the chamber.

Thus the lead walls of the chamber are relieved of the burden of disposing of such latter heat, which in the ordinary chamber process is developed in the chamber rather than outside of it.

The apparatus includes also two, or any other desired number of, lead-chambers 26 and 27, the three main lead-chambers of the particular appliance shown being separated from one another by suitable, packed, intermediate scrubbers 28 and 29 connected to the opposite ends of the two adjacent chambers by appropriate manifolds 31, 32, 33 and 34.

In similar manner, the last chamber 27 is connected through a like manifold 35 and interposed scrubber 36 to the first Gay-Lussac tower 15, and the bottoms of all four chambers and the three associated intervening scrubbers are connected together by suitable types of conduits 37, 38, 39, and 41, whereby the acid produced may readily flow from one to the other, being drawn off as a commercial product at any appropriate point, as, for instance, from the first large chamber 22 at the point 42.

Chamber acid is withdrawn from chamber 22, admixed with water fed at 43, and lowered in temperature by a cooler 44, through which cooling water flows in the customary way, such weakened acid of reduced temperature being led through pipe connections 45 to the several sprays at the top and side walls of the same chamber and to the top of the adjacent scrubber 28.

These sprays produce the same effect in this chamber that the corresponding ones did in the first distribution chamber, that is to say they supply the water for the reaction and assist in cooling the chamber and its contents. Owing to the lengthened narrow shape or form of the chamber and the disposition or arrangement of the sprays, it is assured that all portions of the gaseous mixture are subjected to the minute particles or globules of diluted acid.

The cooled, weakened acid is also delivered to the top of the scrubber and allowed to run down over its packing precipitating out the acid mist, whereby the gases are freed therefrom and consequently better fitted for the continuance of the process in the next chamber or Gay-Lussac towers as the case may be.

Thus the gases in all the chambers are treated in like manner for the same purpose, each having its own cooler 44 and means 43 for the addition of water, the diluted cooled acid being also fed to the top of the next scrubber.

A fan 46 for drawing the gases through the apparatus is employed in the gas connection 47 between the last scrubber 36 and the first Gay-Lussac tower 15, an appropriate pump 48 being inserted in the connection 49 between the top of the first Gay-Lussac tower and the bottom of the second like tower, from the top of which the waste gases escape through a discharge connection 51, other parts, not shown, for the circulation of the acid as described being provided where needed.

As has been presented, it is preferable to feed the necessary water to the chambers as an ingredient or constituent of the dilute acid, because it permits the ready and economical abstraction of the heat caused by its union with the acid outside of the lead chamber, thus reducing the heat-dissipating load on the lead walls of the latter. If preferred for any reason, the water can be fed to the chambers separately from the acid.

The amount of water employed for reducing or diluting the acid is readily ascertained by the Baumé reading of the product, just enough being used to maintain such reading at a predetermined figure, for example, 50 degrees.

The amount of cooled acid recirculated through the chambers and associated or intervening scrubbers is from about five to twenty times the amount of acid produced in the system and by constantly cooling such acid and by developing the reaction heat, caused by the added water, outside of the chambers where it can be easily gotten rid of, the capacity of the plant as a whole can be largely increased over a corresponding plant not employing such cooling medium.

Inasmuch as such reaction water is introduced into the undivided body of gaseous mixture at several sides or angles in an almost infinite number of extremely small globules or drops, the chemical transformation proceeds with abundant efficiency because all portions of the gas are adequately charged with such small particles of the water, thus facilitating and aiding the chemical reaction.

The cooling acid being likewise injected or introduced into the gaseous body is particularly well fitted to perform its cooling function throughout the entire body of gas.

In the actual commercial practice of the process, the acid product is of approximately 50 degrees Baumé, the average temperature in the initial distribution chamber being about 200 to 220 degrees Fahrenheit, the cooled diluted acid of its sprays being in the neighborhood of 150 to 160 degrees Fahrenheit; the average temperature in the first large lead-chamber being about 170 degrees Fahrenheit, the weakened acid of its sprays being approximately 120 to 130 degrees Fahrenheit; the corresponding temperature of the middle of the three large chambers being near 150 degrees Fahrenheit, its sprays being around 100 to 110 degrees Fahrenheit; whereas the similar mean temperature of the last chamber is about 120 degrees Fahrenheit, its diluted cooled acid being around 90 to 100 degrees Fahrenheit.

In the manufacture of sulphuric acid on a commercial scale, the first cost of the installation is relatively high, by reason of the size of the plant and the materials employed, necessitating a comparatively heavy overhead operating expense. Anything, therefore, which will substantially augment or enlarge the capacity of existing plants or which will permit the erection of new plants of a given capacity at a materially lessened expense is of importance and the improved system of cooling constituting the subject matter of this invention meets these requirements in that a plant fitted with this cooling arrangement will produce a greatly increased tonnage of the product, other complementary parts of the apparatus being operated in a coordinated manner to effect such increase in production, because the heretofore limiting and restricting capability of the chamber lead walls to dispose of the heat by radiation and convection to the outer air is henceforth of comparatively little moment as their work may be supplemented by the use of the cooling acid.

A feature of advantage resides in employing separate coolers for the several chambers, because, as their acids are of distinctly different temperatures, it is more economical and efficient, by reason of the greater possible range of permissible temperature in the cooling water of the coolers associated with the earlier chambers, to employ such a segregation, but, of course, a lesser number of cooling appliances may be used, or even one only may be employed, if preferred, and the temperature-reducing acid may be drawn from all or any one or more of the several chambers.

The apparatus illustrated, forms the subject matter of an independent patent application, Serial No. 451116, filed March 10, 1921, and represents the preferred arrangement of the parts of the appliance at the present time, although, of course, it is susceptible of more or less radical structural changes.

Those skilled in this art will readily appreciate that many changes may be incorporated in the process or method herein presented without departure from the substance and essence of the invention and without the sacrifice of any of its substantial benefits and advantages. The appended claims defining the invention include all such obvious expedients falling within their scope.

I claim:

1. In the chamber process of making sulphuric acid in a plurality of chambers connected together in series, the spraying and cooling of the undivided gaseous mixture in each chamber with sulphuric acid withdrawn from the corresponding chamber and first diluted and then cooled before its employment in the spray.

2. In the chamber process of making sulphuric acid in a plurality of chambers connected together in series, the spraying and cooling of the undivided gaseous mixture in each chamber with sulphuric acid withdrawn from the corresponding chamber and first diluted and then cooled before its employment in the spray, and scrubbing the gases during their passage between chambers with such diluted cooled sulphuric acid.

3. In the chamber process of making sulphuric acid in a plurality of chambers connected together in series, the spraying and cooling of the undivided gaseous mixture in each chamber with sulphuric acid withdrawn from the corresponding chamber and first diluted and then cooled before its employment in the spray, and scrubbing the gases during their passage between chambers by diluted cooled sulphuric acid withdrawn from the next adjacent chamber.

CHARLES H. MacDOWELL.